April 20, 1954     L. MAKOUS     2,675,931
SILO UNLOADER CONTROL
Filed June 28, 1950     2 Sheets-Sheet 1
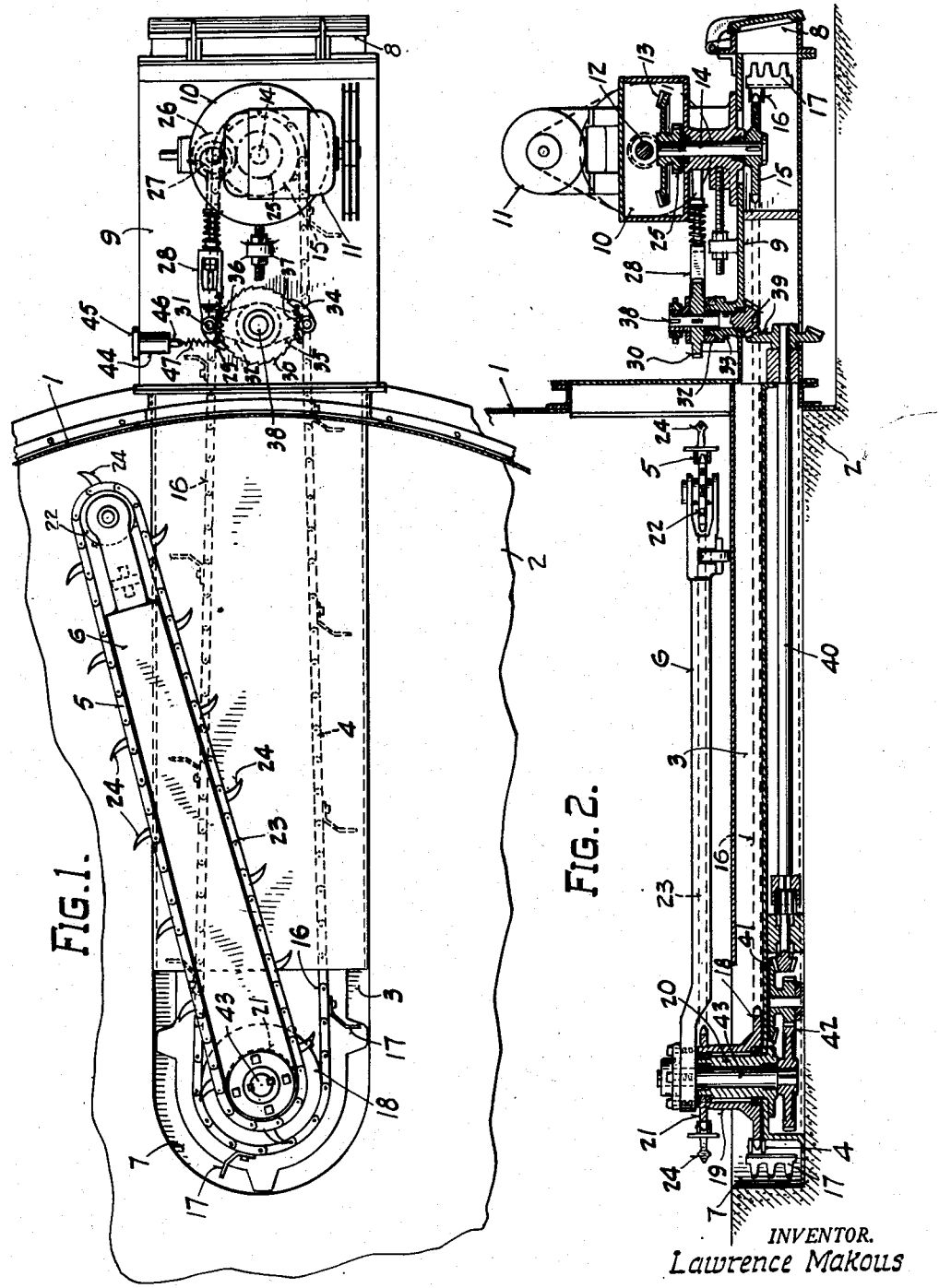
INVENTOR.
Lawrence Makous
BY *Andrus & Sceales*
ATTORNEYS.

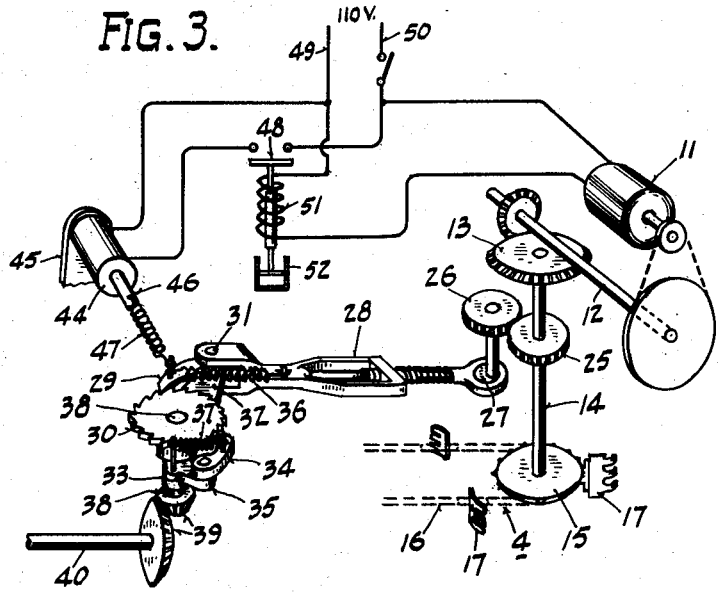
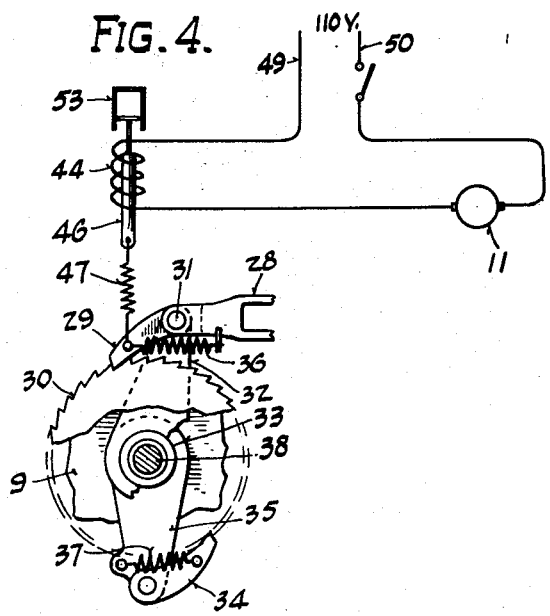

Patented Apr. 20, 1954

2,675,931

UNITED STATES PATENT OFFICE 2,675,931

SILO UNLOADER CONTROL

Lawrence Makous, Milwaukee, Wis., assignor to A. O. Smith Corporation, Milwaukee, Wis., a corporation of New York Application June 28, 1950, Serial No. 170,750

8 Claims. (Cl. 214—17)

This invention relates to unloading mechanisms, and particularly to a device for automatically controlling the drive of a storage structure unloader in response to the loading of the unloader motor.

An object of the invention is to provide an unloading mechanism which will efficiently operate to maintain a substantially constant high output of stored material from a silo or similar storage structure.

Another object of the invention is to provide control arrangements for automatically preventing protracted overloading of the motor of a silo unloader or the like, thereby eliminating the possibility of the opening of the overload switch on said motor and consequent stoppage of the silage feed.

Another object is to provide means operable to disengage the drive of the rotating arm of a silo unloader whenever the cutter hooks associated with the arm become clogged or jammed but to permit re-engagement of the rotating arm drive after the clogging condition has been eliminated as a result of the interruption of the arm movement.

Another object of the invention is to provide control arrangements resiliently connected to disengage the drive of an unloading mechanism and having time delay means to delay disengagement of said drive until the motor connected thereto has been overloaded for a predetermined period of time.

Another object is to provide drive controlling arrangements which are extremely simple and reliable in operation and which may be installed with a minimum of time and expense.

The unloading mechanism controlled by the invention is designed to operate at the bottom of a silo or similar storage structure and comprises a supporting arm rotated in a plane adjacent the silo floor by an electric motor acting through a pawl and ratchet drive, an endless chain type cutter-conveyor arrangement carried by the rotating arm and operated through a separate drive by the rotating arm motor, and another endless chain conveyor disposed in a radial trough in the floor of the silo to receive silage displaced by the rotating arm conveyor and discharge the same to the outside of the silo. In carrying out the invention, a solenoid is connected to disengage the pawl from the ratchet and thus interrupt the rotating arm drive whenever the conveyor carried by the arm is clogged and jammed as a result of improper silage removal or other factors, but to permit re-engagement of the pawl, and thus resumption of the drive, after the clogging condition has been removed by the free action of the separately driven rotating arm conveyor. In one embodiment of the invention the energization of the solenoid is controlled by a relay connected in the motor circuit to respond to the high motor current resulting from overloading, while in another embodiment the solenoid itself is connected in the motor circuit for direct response to overload current therein.

Other objects and advantages of the invention will be set forth more fully in the following description of embodiments of the invention illustrated in the accompanying drawings.

In the drawings:

Figure 1 is a top plan view of the silo unloader, showing the solenoid as connected to the pawl of the pawl and ratchet rotating arm drive;

Fig. 2 is a longitudinal vertical section of the silo unloading mechanism controlled by the solenoid circuits of the invention;

Fig. 3 is a schematic diagram of the wiring and a portion of the drive of one embodiment of the invention; and Fig. 4 is a diagram of a second embodiment of the invention, wherein the relay of the first embodiment is eliminated.

Referring to the drawings and particularly to Figs. 1 and 2, the unloader controlled by the invention is arranged at the bottom of a silo 1 having a concrete foundation 2 with a radial trough 3 formed therein for the purpose of receiving an endless chain type discharge conveyor 4. A cutter-conveyor 5 carried by a supporting member such as rotating arm 6 operates to dislodge or displace stored silage and deliver the same to the center of the foundation 2, so that it falls into the inner end 7 of the trough 3 and is carried by the conveyor 4 to a discharge opening 8 on the outside of the structure.

The discharge opening 8 is arranged at the outer end of an overhanging housing 9 which radiates from the silo 1 in registry with the trough 3. In addition to functioning as a conduit for the silage after it leaves the trough 3, the housing 9 serves to support various external elements of the unloader, including a transmission housing 10 having a reversible electric motor 11 secured to its upper surface.

The discharge conveyor 4 and the cutter-conveyor 5 are both driven through a common drive comprising a horizontal shaft 12 journalled in the transmission housing 10 and connected by a belt and pulleys to the motor 11, a bevel gear 13 geared to the shaft 12 to rotate a downwardly extending shaft 14, and a sprocket 15 disposed at the lower end of shaft 14 in the overhanging housing 9. The sprocket 15 meshes with the endless chain portion 16 of the discharge conveyor 4 and thus drives not only the hook portions 17 of the conveyor but a sprocket 18 which is assembled with the chain 16 at the inner end of the unloader.

The sprocket 18 is mounted at the lower end of a hub 19 which in turn is journalled on a stationary vertical bearing cylinder 20 anchored at the center of the foundation 2. In carrying out the drive for the cutter-conveyor 5, a sprocket 21 is secured at the upper end of the hub 19 and a corresponding sprocket 22 is journalled at the outer end of the rotating arm 6. Both of the sprockets 21 and 22 are assembled with the endless chain portion 23 of the cutter-conveyor 5, so that the cutter hooks 24 of conveyor 5 are moved when the hub 19 is rotated by the endless chain portion 16 of the discharge conveyor 4.

It is essential to the correct functioning of the invention that the arm 6 be rotated by a drive which, although connected to the motor 11 through the bevel gear 13, is independent of the drive for the discharge conveyor 4 and cutter-conveyor 5. The drive shown in the drawings comprises a small spur gear 25 secured to the hub of the bevel gear 13 within the transmission housing 10, a gear 26 meshed with the gear 25 and connected through a downwardly extending shaft to an eccentric 27 mounted between the transmission housing 10 and the overhanging housing 9, and a spring loaded connecting member 28 reciprocated by the movements of the eccentric 27 to operate a driving pawl 29 and thus a ratchet wheel 30.

The driving pawl 29 is pivotally joined at 31 to the connecting member 28 and also to a rocker arm 32 which is journalled on a vertical bearing member 33 and extends laterally therefrom to accurately position the connecting member 28 and pawl 29.

In order to insure that the ratchet wheel 30 does not rotate backwardly after it has been pushed forward by a reciprocating movement of the driving pawl 29, a stationary pawl 34 is provided diametrically opposite pawl 29. The pawl 34 is pivotally supported by a laterally extending stationary arm 35 formed integral with the bearing member 33.

The pawls 29 and 34 are urged into engagement with the ratchet wheel 30 by springs 36 and 37, respectively. These springs are made relatively weak, so that a slight retractive force will operate to rotate one or both of the pawls away from the ratchet wheel 30 and thus interrupt the drive for the rotating arm 6.

The ratchet wheel 30 is keyed to a shaft 38 which extends downwardly through the bearing member 33 and into the housing 9 with which the member 33 is integral. Starting at shaft 38, the remainder of the drive for the rotating arm 6 comprises a pair of bevel gears 39, a drive shaft 40 disposed longitudinally of the trough 3, a second pair of bevel gears 41, a pair of spur gears 42, and a vertical shaft 43 at the center of the foundation 2. The shaft 43 is journalled in the bearing cylinder 20 and bolted at its upper flanged end to the arm 6 to cause the same to rotate slowly in a plane adjacent the floor of the silo.

For a more complete description of the silo unloader with which the invention is employed, reference is made to co-pending application Serial No. 98,794, filed June 13, 1949, and now Patent No. 2,635,770, by Julius B. Tiedemann, and assigned to the assignee of the present invention.

As the arm 6 advances around the bottom of the silo it is resiliently urged against the stored material due to the spring loading of the connecting member 28. The forward pressure thus attained is relatively constant in spite of the fact that the density of the silage, and the degree of packing thereof, varies from place to place so that the silage offers varying resistance to the movement of the arm.

In order to maintain a high silage output when the arm 6 is moving through a pocket of relatively tightly packed material it is necessary that the spring loading of member 28 be rather strong, with consequent heavy forward arm pressure. It has been found, however, that such operation frequently causes the cutter-conveyor 5 to jam and necessitates the presence of an attendant to manually disengage the drive for the rotating arm 6 whenever jamming occurs.

Where the conveyor 5 jams in the absence of an attendant, the motor 11 becomes overloaded and may cease operating entirely due to the action of the manual reset type overload switch normally found on such motors. The only way to prevent jamming and possible cessation of unloading has been to weaken the spring loading of the member 28, but this is highly undesirable in that it greatly reduces the rate of silage removal.

According to the invention, a solenoid 44 is provided to automatically control the engagement of the driving pawl 29 with ratchet wheel 30 in response to the operative or jammed condition of the cutter-conveyor 5. The drive for the rotating arm 6 is thus interrelated with the operation of conveyor 5 in such a way as to permit the unloader to be operated without an attendant and with the desired strong spring loading of connecting member 28.

Solenoid 44 is mounted on a bracket 45 on housing 9 and has a movable core 46 connected by a spring 47 to pawl 29, so that the energization of the solenoid causes retraction of the core and pawl. In addition to providing a flexible linkage between the core 46 and the reciprocating pawl 29, the spring 47 serves to prevent overheating of the solenoid 44 in the event of its energization during a forward stroke of the connecting member 28 when the pawl 29 is held against retraction by the biting of the pawl into the ratchet wheel 30. If the solenoid core 46 were also held against retraction during this interval, as would occur on the drive stroke of the pawl if the connection between the pawl and solenoid core were not resilient, an excessive current would flow in the solenoid due to the low impedance thereof while the core is unretracted. The resilient spring 47 prevents this condition by first permitting the solenoid core to be retracted instantly upon energization of the solenoid and then contracting and pulling the pawl away from the ratchet when it is free for retraction, as during the return stroke of the connection member 28.

Upon de-energization of the solenoid 44, the pawl 29 is pulled into driving engagement with ratchet wheel 30 by the spring 36 which, although sufficiently strong for this purpose, is weaker than the connecting spring 47.

The drive for the rotating arm 6 could also be interrupted by retracting the stationary pawl 34, in which case the ratchet wheel 30 would merely be oscillated back and forth and inoperative instead of being moved in a forward direction alone.

Referring to Fig. 3, the solenoid 44 is connected in series with a pair of normally open relay contacts 48 across the lines 49 and 50 which energize the motor 11. The contacts 48 form part of a current sensitive relay 51 connected in the line 49 in series with the motor.

The design of the relay 51 is such that the contacts 48 will close at a predetermined amperage, for example the maximum rated value for the motor, and will open when the current becomes substantially less than this value. To prevent relay 51 from operating as a result of momentary current surges in the motor 11, a time delay means such as dash pot 52 is connected with the relay armature and adjusted to delay opening of contacts 48 until the motor has been overloaded for a substantial period of time.

In operation, the arm 6 rotates about the floor of the silo and the cutter-conveyor 5 carried by the arm is operated to displace stored material to the inner end 7 of the trough for discharge by the conveyor 4. Unless the stored silage is in a finely divided condition, stalk sections or intertwined groups thereof may catch on the teeth 24 of the conveyor 5 and clog the same. Where the spring loading of connecting member 28 is strong and the forward pressure of arm 6 is large, the clogged teeth 24 will catch in the closely packed silage and greatly retard the movement of the conveyor 5, thereby overloading the motor 11 and increasing the motor current corespondingly.

The current increase causes the relay 51 to close its contacts 48, which results in the energization of solenoid 44 and the interruption, as previously described, of the drive for the rotating arm 6. The cessation of arm movement allows the separately driven conveyor 5 to continue in motion and clear a path in the silage, unimpeded by the biting of teeth 24 into the silage mass, and to free itself of the stalk clogs by rubbing them against the silage mass and causing them to drop into the trough 3.

The resulting reduction in motor load operates through relay 51 to de-energize solenoid 44 and effect resumption of the rotating arm drive. The discharge of silage continues substantially constant, even during the described interval of interrupted arm motion, due to the fact the conveyor 5 in clearing itself continues to feed silage to the discharge conveyor 4.

In a second embodiment of the invention, illustrated in Fig. 4, the relay 51 of the first embodiment is not employed and the solenoid 44 is connected in the line 49 in series with the motor 11. As in the case of the first embodiment, a dash pot 53 is employed to prevent drive interruption due to momentary current surges. The solenoid 44 is thus, in essence, used as a current relay to attract its core 46 at a predetermined current value and release it at a substantially lower value. The operation of the modified form of the invention, except for the elimination of the intermediate relay, is the same as was described in connection with the first embodiment.

In the event of the total jamming of the cutter-conveyor 5 and consequent complete stoppage of motor 11 it may be necessary to reverse the motor in order to clear the teeth 24 and restore the mechanism to operating condition. This reversing, which is preferably performed with the driving pawl 29 in its disengaged position, may be done either manually or with an automatic reversing switch responsive to motor conditions.

The arrangements described in connection with both embodiments of the invention constitute extremely simple ways of preventing jamming and of maintaining the output of a silo unloader at a substantially constant value. Because of the slight force required to retract the pawl and interrupt the rotating arm drive, the solenoids employed may be relatively small and the cost of installing the invention relatively little.

Various embodiments of the invention may be employed within the scope of the accompanying claims.

I claim:

1. In a mechanism for unloading silos and similar storage structures, a supporting member mounted in the silo for movement against the material being stored, a displacing arrangement carried by said supporting member and operable to successively displace portions of the stored material for discharge from the silo, an electric motor, a drive connecting said supporting member and said electric motor and including a clutch means to interrupt the forward movement of the supporting member, a separate drive operatively connecting said motor and said displacing arrangement, means responsive to the electrical conditions in the circuit of said motor resulting from the load thereon to disengage said clutch means and interrupt said supporting member drive when said displacing arrangement is jammed and the motor is heavily loaded, and means to effect re-engagement of the clutch means and resumption of the supporting member drive when the motor load has been decreased by the free operation of said displacing arrangement.

2. In a mechanism for unloading stored material from silos and similar storage structures, an arm pivotally mounted in the silo for rotation about a vertical axis, a conveyor arrangement carried by said arm and operable to successively dislodge portions of the stored material and convey the same away from the initial locations thereof, an electric motor, a drive connecting said rotating arm and said electric motor and including a ratchet and a pawl normally held in driving engagement with said ratchet but movable to a disengaged position to interrupt the forward movement of said rotating arm, a separate drive connecting said conveyor arrangement and said motor, means responsive to the electrical conditions in the circuit of said motor resulting from the load thereon to move said pawl and thereby to interrupt said rotating arm drive when said conveyor arrangement is jammed and the motor is heavily loaded, and means to effect re-engagement of the pawl and resumption of the arm drive when the motor load has been decreased by the free operation of said conveyor arrangement.

3. In a mechanism for unloading silos and similar storage structures, a supporting member mounted in the silo for movement against the material being stored, a displacing arrangement carried by said supporting member and operable to successively displace portions of the stored material for discharge from the silo, an electric motor, a drive connecting said supporting member and said electric motor and including a clutch means to interrupt the forward movement of the supporting member, a separate drive operatively connecting said motor and said displacing arrangement, a solenoid electrically connected for response to the amount of current flowing in said motor, and a movable core for said solenoid, said solenoid and core being operable to disengage said clutch means when said displacing arrangement is clogged and the motor is drawing a large current, and means to re-engage said clutch means when the load on the motor has been decreased and the flow of current therein diminished by the free operation of said separately driven displacing arrangement.

4. In a mechanism for unloading silos and similar storage structures, a supporting member mounted in the silo for movement against the material being stored, a displacing arrangement carried by said supporting member and operable to successively displace portions of the stored material for discharge from the silo, an electric motor, a drive connecting said supporting member and said electric motor and including a ratchet wheel and a pawl normally held in driving engagement with said wheel but movable to a retracted position to interrupt the forward movement of the supporting member, a separate drive operatively connecting said motor and said displacing arrangement, a solenoid mounted adjacent said pawl and operable to cause the same to move between its driving and retracted positions, and a relay connected in the circuit of said motor and having contacts connected to control the energization of said solenoid, said relay operating upon jamming of said displacing arrangement and consequent increase in motor current to cause the solenoid to retract said pawl from said wheel, and means to re-engage said pawl with said wheel and effect resumption of the forward movement of the supporting member upon clearing of the obstructing condition and decrease in motor current.

5. Apparatus of the character described comprising an arm pivoted at the axis of the silo and extending outwardly therefrom for rotation thereabout, a first conveyor mounted on said arm and operable to convey stored material radially and inwardly to said axis, a second conveyor mounted to convey said stored material from said axis to the exterior of the silo, an electric motor, a drive connecting said arm and said motor and including a ratchet and a pawl normally held in driving engagement with said ratchet but movable to a disengaged position for interruption of the forward movement of the rotating arm, driving means separate from said rotating arm drive and operatively connecting said motor and said conveyors, a solenoid mounted adjacent said pawl and resiliently connected therewith to cause the same to move between its driving and disengaged positions, and a relay connected in series with said motor and having contacts connected to control the energization of said solenoid, said relay operating upon jamming of said first conveyor and consequent increase in motor current to cause said solenoid to retract said pawl from said ratchet, and means to re-engage said pawl with said ratchet and effect resumption of the forward movement of said arm upon removal of the obstructing condition and decrease in motor current.

6. In a mechanism for unloading silos and similar storage structures, a supporting member mounted in the silo for movement against the material being stored, a displacing arrangement carried by said supporting member and operable to successively displace portions of the stored material for discharge from the silo, an electric motor, a drive connecting said supporting member and said electric motor and including a ratchet wheel and a pawl normally held in driving engagement with said wheel but movable to a retracted position to interrupt the forward movement of the supporting member, a separate drive operatively connecting said motor and said displacing arrangement, a solenoid mounted adjacent said pawl and operable to move the same between its driving and retracted positions, said solenoid being connected in series with said motor and adjusted to retract said pawl from said wheel when said displacing arrangement is clogged and the current in said motor is relatively large, and means to re-engage said pawl with said wheel when the motor load has been decreased and the flow of current therein diminished by the free operation of said separately driven displacing arrangement.

7. Apparatus of the character described comprising an arm pivoted at the axis of the silo and extending outwardly therefrom for rotation thereabout, a first conveyor mounted on said arm and operable to convey stored material radially and inwardly to said axis, a second conveyor mounted in the silo to receive stored material from said first conveyor and convey the same from said axis to the exterior of the silo, an electric motor, a drive connecting said arm and said motor and including a ratchet and a pawl normally held in driving engagement with said ratchet but movable to a disengaged position for interruption of the forward movement of said rotating arm, driving means separate from said rotating arm drive and operatively connecting said motor and said conveyors, and a solenoid mounted adjacent said pawl and resiliently connected therewith to cause the same to move between its driving and disengaged positions, said solenoid being connected in the circuit of said motor for response to the amount of current flowing therethrough and consequently to the loading thereof resulting from the free or jammed condition of said first conveyor.

8. In a mechanism for unloading silos and similar storage structures, a supporting member mounted in the silo for movement against the material being stored, a displacing arrangement carried by said supporting member and operable to successively displace portions of the stored material for discharge from the silo, an electric motor, a drive connecting said supporting member and said electric motor and including a ratchet wheel and a pawl normally held in driving engagement with said wheel but movable to a retracted position to interrupt the forward movement of the supporting member, a separate drive operatively connecting said motor and said displacing arrangement, a solenoid mounted adjacent said pawl and operably associated therewith to cause the same to move between its driving and disengaged positions, circuit means connecting said solenoid and said motor to control the energization of the solenoid in response to current conditions in the motor resulting from the jamming of said displacing arrangement, and time delay means to prevent operation of said pawl by momentary current surges in said motor.

References Cited in the file of this patent

UNITED STATES PATENTS

| Number | Name | Date |
|---|---|---|
| 1,040,863 | Blaxter | Oct. 8, 1912 |
| 1,469,802 | Mellenthin | Oct. 8, 1923 |
| 2,430,203 | Bailey | Nov. 4, 1947 |